US010789481B2

(12) United States Patent
Croxford (10) Patent No.: US 10,789,481 B2
(45) Date of Patent: Sep. 29, 2020

(54) VIDEO DATA PROCESSING

(71) Applicant: Apical Ltd, Cambridge (GB)

(72) Inventor: Daren Croxford, Swaffham Prior (GB)

(73) Assignee: Apical Ltd., Cambridge (GB)

( * ) Notice: Subject to any disclaimer, the term of this patent is extended or adjusted under 35 U.S.C. 154(b) by 102 days.

(21) Appl. No.: 15/990,426

(22) Filed: May 25, 2018

(65) Prior Publication Data

US 2019/0362155 A1 Nov. 28, 2019

(51) Int. Cl.
*G06K 9/00* (2006.01)
*G06K 9/66* (2006.01)
*G06N 3/04* (2006.01)
*G06N 3/08* (2006.01)
*G06T 7/246* (2017.01)

(52) U.S. Cl.
CPC ........... *G06K 9/00744* (2013.01); *G06K 9/66* (2013.01); *G06N 3/04* (2013.01); *G06N 3/08* (2013.01); *G06T 7/248* (2017.01); *G06T 2207/10016* (2013.01)

(58) Field of Classification Search
CPC ................. G06T 7/00–97; G06T 7/248; G06T 2207/10016; G06K 9/00744–00778; G06K 9/66; G06N 3/04; G06N 3/08
See application file for complete search history.

(56) References Cited

U.S. PATENT DOCUMENTS

| | | | |
|---|---|---|---|
| 10,255,683 B1* | 4/2019 | Gopal | ..................... G06T 7/223 |
| 2018/0286006 A1* | 10/2018 | Kaburlasos | ............... G06T 1/60 |
| 2019/0197364 A1* | 6/2019 | Cheng | .................. G06K 9/6284 |

* cited by examiner

*Primary Examiner* — Raymond S Dean
(74) *Attorney, Agent, or Firm* — EIP US LLP (57) ABSTRACT

A method of processing video data representative of a video. A feature of a first frame of the video is identified by performing a feature detection operation in a first and second portion of the first frame. Subsequently, a feature of a second frame of the video is identified by processing the second frame to identify a first portion of the second frame which changed with respect to the first portion of the first frame, a second portion of the second frame which is substantially unchanged with respect to the second portion of the first frame, and a third portion of the second frame which is substantially unchanged with respect to a third portion of the first frame. The feature detection operation is performed in the first and third portions of the second frame and omitted in the second portion of the second frame.

20 Claims, 7 Drawing Sheets

VIDEO DATA PROCESSING

BACKGROUND OF THE INVENTION

Field of the Invention

The present invention relates to methods and apparatus for processing video data representative of a video.

SUMMARY

Background

Methods to process video data, for example to perform object detection or object recognition, may be computationally intensive. It is desirable to reduce the processing demands of such methods.

BRIEF DESCRIPTION OF THE DRAWINGS

Further features will become apparent from the following description, given by way of example only, which is made with reference to the accompanying drawings.

DETAILED DESCRIPTION OF CERTAIN INVENTIVE EMBODIMENTS

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Portions of a video may remain relatively unchanged from frame to frame. As an illustrative example, if the video has been obtained from a security camera at a fixed position, the portion of the video corresponding to a background of a scene, which may stay the same over time, may also remain the same over a series of frames.

Processing a video, for example to perform object detection or object recognition, typically requires a significant amount of computation. However, some of this processing may be redundant if portions of the video have not changed or have changed a relatively small amount over time.

Methods in accordance with examples described herein involve identifying portions of a second frame of a video which are changed with respect to corresponding portions of a first frame of the video (which is prior to the second frame). These portions may be updated in preference to, or before, other portions of the second frame which are substantially unchanged with respect to the first frame. Conversely, portions of the second frame which are substantially unchanged may be processed at a lower rate than the portions which have changed. Despite this, the processing of the video data may not be unduly affected. For example, it may still be possible to perform satisfactory object detection or object recognition without processing the entirety of each frame. In this way, computations or processing may be reduced. Power usage may also be reduced. Furthermore, such methods may have a reduced bandwidth for accessing storage than other methods.

Figure 1:
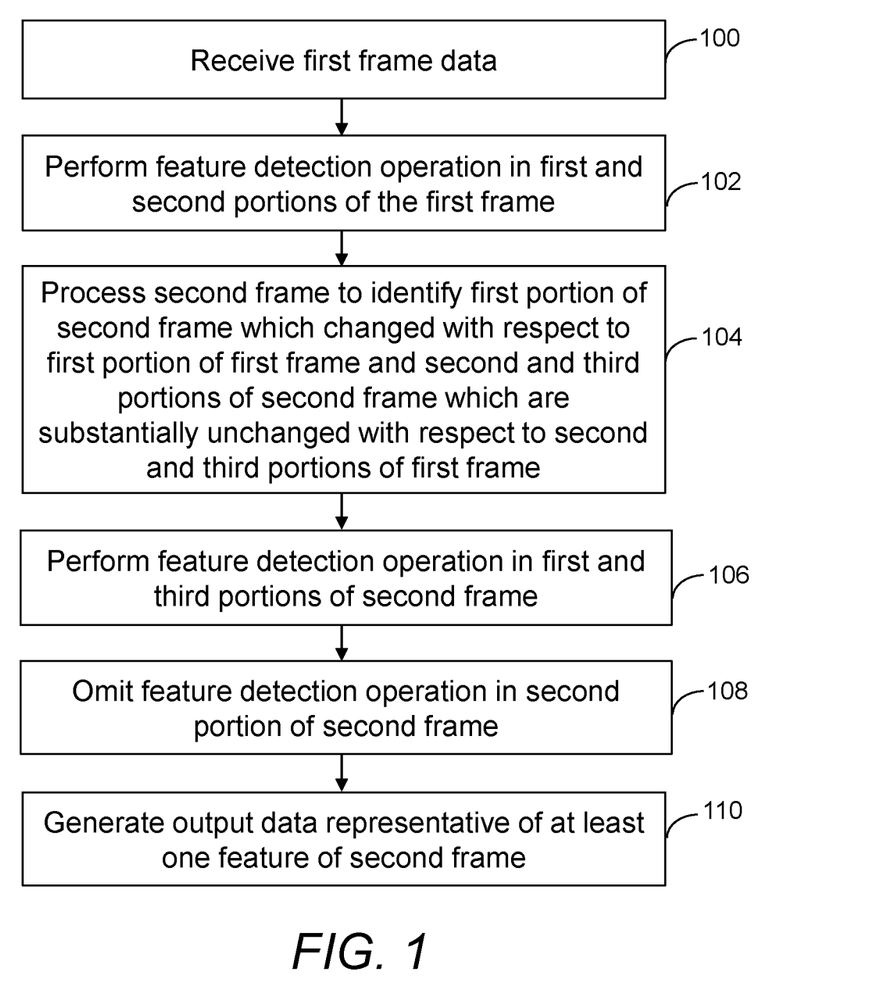
FIG. 1 is a flow diagram showing a method of processing video data according to examples.

FIG. 1 is a flow diagram showing a method of processing video data according to examples. The method of FIG. 1 may be implemented by a video processing system, such as the system illustrated schematically in FIG. 8 (described below).

The method of FIG. 1 may be used to identify at least one feature of a first and a second frame of a video. In this example, the second frame is subsequent to the first frame. The second frame may be immediately consecutive to the first frame (with no intervening frames therebetween) or there may be one or more frames between the first frame and the second frame. A frame for example corresponds to a still image. A series or sequence of frames, which typically represent a series of sequential images, can be considered to correspond to a video or a moving picture. A frame generally includes a plurality of pixels.

The at least one feature may be a structure-based feature indicative of the presence of certain types of structure in the image, such as edges or lines in the image. Alternatively, the at least one feature may be an object-based feature indicative of the presence of a particular class of object in the image (such as a person, a vehicle or an animal), or an image-based feature indicative that the image may be categorized or classified into a particular category based on the content of the image.

At item 100 of FIG. 1, the first frame of the video is received. At item 102 of FIG. 1, at least one feature of the first frame is identified by processing a first portion of first frame data associated with the first frame, where the first portion of the first frame data is associated with a first portion of the first frame, to perform a feature detection operation in a first portion of the first frame. The identification of the at least one feature of the first frame further includes processing a second portion of the first frame data, where the second portion of the first frame data is associated with a second portion of the first frame, to perform the feature detection operation in the second portion of the first frame. A portion of a frame is for example a region of a frame, such as a block or tile of a frame. However, a portion of a frame may be any shape or size. In this example, the first and second portions of the first frame are separate portions of the first frame, which each correspond to a different respective area of the first frame. For example, where the first frame may be represented within a particular coordinate system, the first and second portions of the first frame may correspond to respective regions bound by different coordinates, respectively, within the first frame. The first and second portions of the first frame may be entirely nonoverlapping. There may be a gap or separation between the first and second portions of the first frame, or the first and second portions of the first frame may at least partly adjoin each other. Alternatively, the first and second portions of the first frame may partially overlap each other, and may therefore be partially coincident. Nevertheless, though, the first and second portions of the first frame are typically not exactly identical in shape, size and/or location as each other. The first and second portions of the first frame data may represent pixel values of pixels of the first and second portions of the first frame, or may instead represent features (such as feature maps) of the first and second portions of the first frame. In this way, the first and second portions of the first frame data are associated with the first and second portions of the first frame, respectively, and may therefore represent features or characteristics of the first and second portions of the first frame without directly corresponding to or representing pixel values of the first and second portions of the first frame.

The feature detection operation may involve the convolution of pixel values or feature map values represented by the first portion and the second portion of the first frame data with one or more kernels. A kernel for example allows feature of an image to be identified. For example, some kernels may be used to identify edges in an image and others may be used to identify horizontal or vertical features in the image (although this is not limiting, and other kernels are possible). In examples, the feature detection operation may include detecting at least one image feature using a trained machine learning system, such as a neural network (NN). A suitable NN is a convolutional neural network (CNN) although other NNs are possible. An example of using a CNN to perform the feature detection operation is discussed further below with reference to FIG. 3.

Other operations may be applied to the first frame in addition to the feature detection operation of item 102 in order to identify the at least one feature of the first frame. For example, while the feature detection operation of item 102 may detect features of the first and second portions of the first frame, in some cases further processing may be applied to other portions of the first frame to identify the at least one feature of the first frame. For example, the feature detection operation of item 102 may detect particular high-level structure-based features in the first and second portions of the first frame, such as edges, corners or ridges. However, to identify that the first frame includes a particular object (which may extend over a larger area of the first frame than the first and second portions of the first frame), information obtained from the first and second portions of the first frame may be combined with information obtained from other portions of the first frame. For example, where the first and second portions of the first frame each correspond to a respective block or tile of the first frame, feature information representative of features of other blocks or tiles of the first frame may be combined with that obtained from processing of the first and second portions of the first frame data with the feature detection operation 102 to identify that the first frame includes a particular object extending over a plurality of blocks of the first frame.

Subsequently at least one feature of the second frame may be identified. Identification of the at least one feature of the second frame in the example of FIG. 1 includes, at item 104, processing the second frame to identify a first portion of the second frame which changed with respect to the first portion of the first frame, a second portion of the second frame which is substantially unchanged with respect to the second portion of the first frame, and a third portion of the second frame which is substantially unchanged with respect to a third portion of the first frame. In examples such as this, the third portion of the first frame is different from the first and second portions of the first frame, and the third portion of the second frame is different from the first and second portions of the second frame. For example, the first, second and third portions of the first frame may not overlap each other. Similarly, the first, second and third portions of the second frame may also not overlap each other.

Example methods of identifying the first portion of the second frame which has changed with respect to the first portion of the first frame are discussed further below with reference to FIGS. 6 and 7.

Portions of two different frames may be considered to be substantially the same where they are identical, and for example include pixels with identical pixel values (such as identical pixel intensity values). In other cases, portions of two different frames may be considered to be substantially the same where they are similar or the same within a certain tolerance. For example, where a difference between portions of two difference frames is less than 20%, 15%, 10%, 5% or 1%, these portions may be considered to be substantially the same. A discussion of methods of determining that portions of a frame are substantially the same as corresponding portions of a previous frame is provided in further detail below with reference to FIGS. 6 and 7.

At item 106 of FIG. 1, a first portion of second frame data associated with the second frame, the first portion of the second frame data being associated with a first portion of the second frame, is processed to perform the feature detection operation in the first portion of the second frame (which has changed with respect to the first portion of the first frame). In addition, a third portion of the second frame data is processed to perform the feature detection operation in the third portion of the second frame (which is substantially unchanged with respect to the third portion of the first frame). As for the first frame data, the first and second portions of the second frame data may represent pixel values of pixels of the first and second portions of the second frame, or may instead represent features (such as feature maps) of the first and second portions of the second frame.

At item 108 of FIG. 1, processing of a second portion of the second frame is omitted to omit the feature detection operation in the second portion of the second frame. Hence, methods in accordance with FIG. 1 may include selecting one of a plurality of portions of the second frame data corresponding to substantially unchanged portions of the second frame for processing using the feature detection operation described above (which is for example the same feature detection operation as that applied to the first and second portions of the first frame data). In other words, in methods in accordance with FIG. 1, portions of the second frame data corresponding to a subset of substantially unchanged portions of the second frame are processed using the feature detection operation without processing other portions of the second frame data corresponding to at least one of the substantially unchanged portions of the second frame using the feature detection operation. This therefore reduces the amount of processing compared with processing each frame in its entirety, regardless of its similarity to a previous frame. Consequently, this may improve the efficiency and reduce the power consumption of methods such as that of FIG. 1.

For example, in methods in accordance with FIG. 1, certain portions of a video (which for example correspond with substantially unchanging portions) may be processed using the feature detection operation at a lower rate than more rapidly changing portions of the video. In cases in which the video includes a plurality of frames including the first and second frames, and in which each of the plurality of frames includes a first, second and third portion respectively, the method may include determining that a first rate of change of the first portion of the plurality of frames is higher than a second rate of change of the second portion of the plurality of frames (which for example includes the second portions of the first and second frames, which are substantially unchanged). In these cases, the feature detection operation may be performed in the first portion of the plurality of frames at a first rate which is higher than a second rate of performing the feature detection operation in the second portion of the plurality of frames. By reducing the rate of processing substantially unchanged portions of the video, such as the second portions, the memory bandwidth may be reduced (as this may reduce memory accesses which may otherwise be required to perform the feature detection operation in these portions). The processing requirements and power consumption of a video processing system implementing such a method may also be reduced.

In the example of FIG. 1, there are a plurality of portions of the frames which remain substantially unchanged across a plurality of frames. There is, for example, also a third portion of the first and second frames, which is substantially unchanged. In such cases, the method may also include determining that the first rate of change is higher than a third rate of change of the third portion of the plurality of frames and performing the feature detection operation in the third portion of the plurality of frames at a third rate which is lower than the first rate. Each of the second and third rates may meet or exceed a threshold processing rate. For example, the second and third rates may be the same as each other (or different) and may correspond to a threshold processing rate which is a minimum rate at which the feature detection operation is to be performed. This allows the entire frame to processed at a rate which is equal to or above the threshold processing rate. However, different substantially unchanged portions may be processed at different points in time. For example, the feature detection operation may be performed in the third portion of the second frame and not in the second portion of the second frame. In a subsequent frame, though, the feature detection operation may be performed in the second portion of the subsequent frame and not in the third portion of the second frame. This may therefore smooth out the processing load of a video processing system rather than other approaches in which there may be a sudden increase in processing if an entire frame is subjected to the feature detection operation periodically. The threshold processing rate may be selected based on the processing capacity of the video processing system and the proportion of each frame which is expected to change across the plurality of frames.

Furthermore, by processing changing portions of the video at a higher rate than substantially unchanged portions, processing resources may be focused or concentrated on the changing portions. This may reduce latency for feature detection in these portions of the video.

An output of the application of the feature detection operation to the second portion of the first frame data may be used to represent a feature of the second portion of the second frame, in which the feature detection operation is omitted. However, the third portion of the second frame data may be newly processed by performing the feature detection operation in this portion of the second frame, rather than retrieving a previous output. In this way, portions of frames of a video which are substantially unchanging may be updated periodically. For example, the substantially unchanging portions of a video may be updated sequentially, at a relatively constant rate, rather than globally updating all of the substantially unchanged portions every n frames. For example, m substantially unchanged portions of a frame may be updated each frame, where m is less than the total number of substantially unchanged portions of the frame. The decision of which of a plurality of substantially unchanged portions of the second frame the feature detection operation is to be performed in is described further below with reference to FIG. 5.

Finally, at item 110 of FIG. 1, output data representative of at least one feature of the second frame is generated. It is to be appreciated that the output data may be second output data, and that first output data (representative of the at least one feature of the first frame) may have been generated previously (although this is not shown in FIG. 1).

The at least one feature of the second frame may be identified by combining first feature data obtained from performing the feature detection operation in the first portion of the second frame (as in item 106), second feature data obtained from performing the feature detection operation in the second portion of the first frame (as in item 102), and third feature data obtained from performing the feature detection operation in the third portion of the second frame (as in item 106). In such cases, the second feature data may for example be written to storage after the feature detection operation is performed in the second portion of the first frame. The second feature data may then be retrieved from the storage during the identification of the at least one feature of the second frame. The combination of the first, second and third feature data may be used to generate the output data representative of the at least one feature of the second frame. This will be explained further below with reference to FIG. 7, for example.

Figure 2:
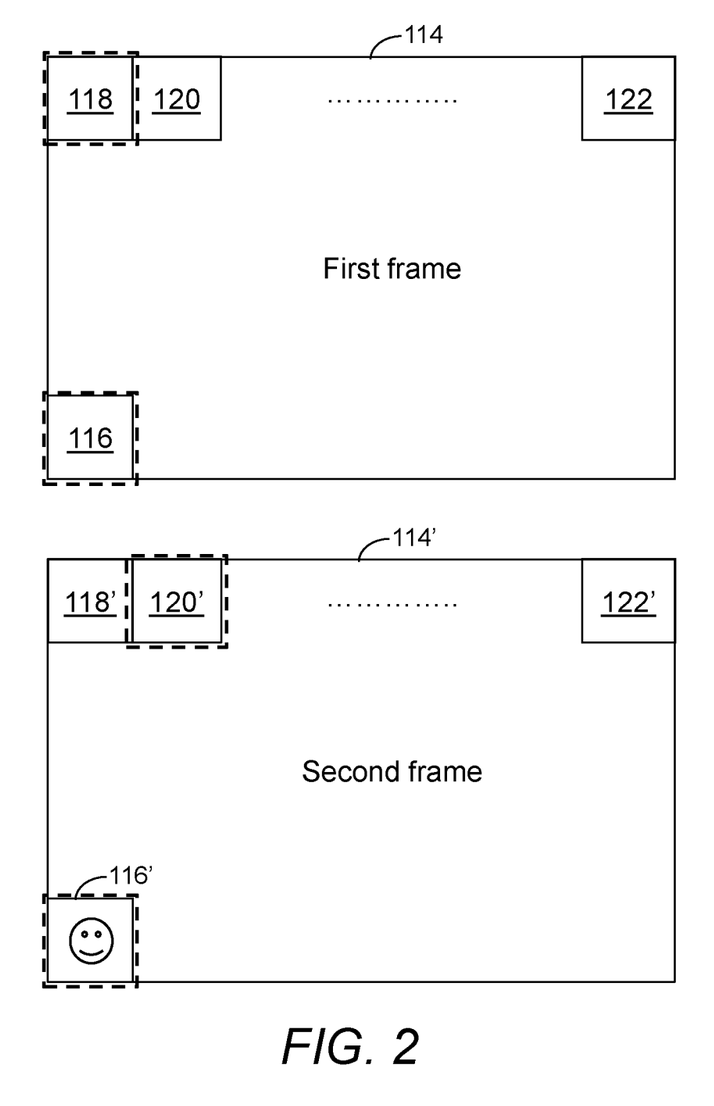
FIG. 2 shows schematically features of a method of processing video data according to examples.

As will be appreciated, the method of FIG. 1 may be applied repeatedly as further frames of the video are received. FIG. 2 shows schematically the application of the method of FIG. 1 in an example in which video data representative of a video comprising a first frame 114 and a second frame 114' subsequent to the first frame 114 is processed. Features of the second frame 114' which correspond to similar features of the first frame 114 are labelled with the same reference numeral but appended with an apostrophe.

The first frame 114 has a first portion 116, a second portion 118, a third portion 120 and an nth portion 122. After receipt of the first frame 114, at least one feature of the first frame 114 is identified by processing a first portion of first frame data associated with a first portion 116 of the first frame 114 and a second portion of the first frame data associated with a second portion 118 of the first frame 114 using a feature detection operation such as that described above. Processing of a third portion of the first frame data associated with the third portion 120 of the first frame 114 may be omitted during the identification of the at least one feature of the first frame 114. Alternatively, for example if the first frame 114 is the first frame in a series of frames of the video, the feature detection operation may also be performed in the third portion 120, and possibly also in other portions of the first frame 114, such as the nth portion 122.

Subsequently, the second frame 114' is received. Like the first frame 114, the second frame 114' includes a first portion 116', a second portion 118', a third portion 120' and an nth portion 122', which correspond to the first portion 116, the second portion 118, the third portion 120 and the nth portion 122 of the first frame 114, respectively. After receipt of the second frame 114', at least one feature of the second frame 114' is identified by processing first and third portions of second frame data associated with the second frame to perform the feature detection operation in the first and third portions 116', 120' of the second frame 114' and omitting processing of a second portion of the second frame data to omit the feature detection operation in the second portion 118' of the second frame 114'. In FIG. 2, the portions of the first frame 114 and the second frame 114' in which the feature detection operation is applied are surrounded by a dashed box, for ease of illustration.

In this example, the video is a video of a scene which is relatively unchanging in a top region (which includes the second, third and nth portions of the first and second frames 114, 114'). For example, the scene may be an outdoor scene, with the top region corresponding to the sky. However, the bottom region, which includes the first portions 116, 116' of the first and second frames 114, 114' changes between first frame 114 and the second frame 114'. In the first frame 114, the first portion 116 includes merely background scenery (illustrated schematically in FIG. 2 as a blank white box). In contrast, in the second frame 114', a person is present in the first portion 116'.

As explained above, methods described herein may include identifying a number of portions of the second frame 114' which are substantially the same as corresponding portions of the first frame 114. These portions may be adjoining (in other words, continuous) or separate from each other. In the example of FIG. 2, all the portions across the top of the first and second frames 114, 114' are substantially unchanged, although only the second, third and nth portions are labelled, for clarity. In such cases, a region of a plurality of frames which is substantially unchanged throughout the plurality of frames may be identified. Such a region may subsequently be divided or segmented into a plurality of portions, in which the feature detection operation may be performed in turn. In this case, the feature detection operation is applied in the second portion 118 of the first frame 114 and in the third portion 120' of the second frame 114'. In a frame subsequent to the second frame 114' a further portion which is substantially the same as a corresponding portion of the second frame 114' (such as a fourth portion, which may be adjacent to the third portion) may be processed using the feature detection operation, while omitting processing of both the second and third portions of the subsequent frame.

In examples in accordance with FIG. 2, each of a plurality of frames may include a first portion, a second portion and a third portion, as explained above with reference to FIG. 1. For example, these portions may remain constant or the same across the plurality of frames. For example, the first, second and third portions may have the same location, and may correspond to the same pixel coordinates, in each of the plurality of frames.

In other examples, a location of the first, second and third portions may change across the plurality of frames. In such cases, though, the first, second and third portions may each correspond to the same portion of a scene captured in the plurality of frames. For example, where a video camera used to capture the video is moved from frame to frame, the first portion may for example correspond to the same patch of sky in each of the frames, although the position of that patch of sky (expressed in terms of pixel coordinates) may differ between frames. For example, methods in accordance with FIG. 2 may include determining the second portion 118' of the second frame 114' which corresponds to the second portion 118 of the first frame 114 based on motion data indicative of a motion of an image sensor used to capture the video data. The image sensor may be any suitable image sensor or image capture device which is capable of capturing a series of images to create a video. The motion data may be obtained in any suitable way for determining movement of an image sensor, as the skilled person will appreciate. For example, the image sensor may include or be coupled to an accelerometer, to measure motion of the image sensor during capture of the video. Alternatively, a motion estimation process based on image processing, such as a tracking process in which the position of certain points in an image (such as keypoints which may correspond with distinctive characteristics of the image) may be determined across a series of frames.

As explained above, there are a number of different feature detection operations which may be used to detect features of a frame. In examples, the feature detection operation includes the use of a neural network. An example of a neural network 124 is shown schematically in FIG. 3.

Figure 3:
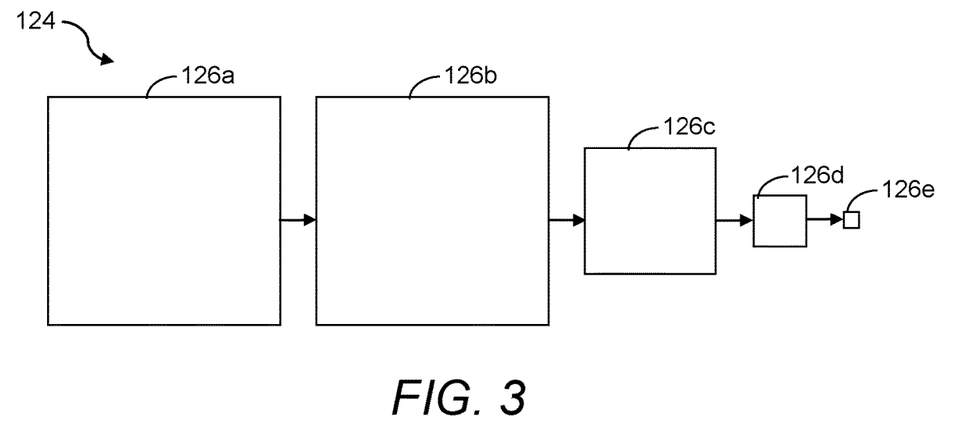
FIG. 3 shows schematically a neural network according to examples.

The neural network 124 includes a number of different layers 126a, 126b, 126c, 126d, 126e. In FIG. 3, the neural network 124 is a convolutional neural network (CNN). A typical CNN includes an input layer (126a), a plurality of convolutional layers (two of which, 126b, 126c, are shown in FIG. 3), a number of fully connected layers (one of which, 126d, is shown in FIG. 3) and an output layer 126e. The input layer for example corresponds with an input to the neural network 124, which in this example is image data. The image data is for example 224 pixels wide and 224 pixels high and includes 3 color channels (such as a red, green and blue color channel). The convolutional layers typically extract particular features from the input data, to create feature maps. The fully connected layers then use the feature maps for classification. In the example of FIG. 3, the output of the second layer 126b undergoes pooling before it is input to the third layer 126c. Pooling for example allows values for a region of an image or a feature map to be aggregated or combined, for example by taking the highest value within a region. For example, with 2×2 max pooling, the highest value of the output of the second layer 126b within a 2×2 patch of the feature map output from the second layer 126b is used as an input to the third layer 126c, rather than transferring the entire output of the second layer 126b to the third layer 126c. This reduces the amount of computation for subsequent layers of the neural network 124. This is shown schematically in FIG. 3 as a reduction in size of the third layer 126c compared to the second layer 1206. Further pooling is performed between the third and fourth layers 126c, 126d and between the fourth and fifth layers 126d, 126e. It is to be appreciated that the neural network 124 of FIG. 3 has been greatly simplified for ease of illustration and that typical neural networks may be significantly more complex.

In general, neural networks such as the neural network 124 of FIG. 3 may undergo what is referred to as a training phase, in which the neural network is trained for a particular purpose. A neural network typically includes a number of interconnected nodes, which may be referred to as artificial neurons, or neurons. The internal state of a neuron (sometimes referred to as the activation) typically depends on an input received by the neuron. The output of the neuron then depends on the input and the activation. The output of some neurons is connected to the input of other neurons, forming a directed, weighted graph in which edges (corresponding to neurons) or vertices (corresponding to connections) of the graph are associated with weights, respectively. The weights may be adjusted throughout training, altering the output of individual neurons and hence of the neural network as a whole.

In the example of FIG. 3, the neural network 124 has been trained to classify image data, for example to determine whether a particular object is present in the image represented by the image data. Training the neural network 124 in this way for example generates one or more kernels associated with at least some of the layers (such as layers of the neural network 124 other than the input layer 126a and the output layer 126e). The kernels for example allow features of an image to be identified. For example, some of the kernels may be used to identify edges in the image represented by the image data and others may be used to identify horizontal or vertical features in the image (although this is not limiting, and other kernels are possible). The precise features that the kernels identify will depend on the object that the neural network 124 is trained to identify. The kernels may be of any size. As an example, each kernel may be a 3 by 3 matrix, which may be convolved with the image data with a stride of 1. The kernels may be convolved with an image patch (or a feature map obtained by convolution of a kernel with an image patch) to identify the feature the kernel is designed to detect. Convolution generally involves multiplying each pixel of an image patch (in this example a 3 by 3 image patch) or each element of a feature map by a weight in the kernel before adding the result of this operation to the result of the same operation applied to neighboring pixels or neighboring feature map elements. A stride for example refers to the number of pixels or feature map elements a kernel is moved by between each operation. A stride of 1 therefore indicates that, after calculating the convolution for a given 3 by 3 image patch, the kernel is slid across the image by 1 pixel and the convolution is calculated for a subsequent image patch. This process may be repeated until the kernel has been convolved with the entirety of the image (or the entire portion of the image for which a convolution is to be calculated), or with the entirety of a feature map the kernel is to be convolved with. A kernel may sometimes be referred to as a filter kernel or a filter. A convolution generally involves a multiplication operation and an addition operation (sometimes referred to as an accumulation operation). Thus, a neural network accelerator, which may be dedicated to implementing a neural network, may include a multiplier-accumulator (MAC) unit configured to perform these operations.

After the training phase, the neural network 124 (which may be referred to as a trained neural network 124) may be used to classify input images. For example, the neural network 124 may be used to identify whether the object the neural network 124 has been trained to identify is present in a given input image. This process may be referred to as classification or inference. Classification typically involves convolution of the kernels obtained during the training phase with image patches of the input image to generate a feature map. The feature map may then be processed using at least one fully connected layer to classify the image.

In the example of FIG. 3, the second layer 126b involves the convolution of 64 different kernels with the image data of the first layer 126a. Each of the 64 kernels is for example arranged to identify a different respective feature of the image data. In the example of FIG. 3, in which the image data is 224 by 224 pixels, with 3 color channels, and is convolved with 64 kernels of a size of 3 by 3 pixels, the second layer 126b of the neural network 124 involves 224×224×3×(3×3)×64 multiply-accumulate operations, i.e. 86 million multiply-accumulate operations. There will also be a large number of further multiply-accumulate operations associated with each of the third and fourth layers 126c, 126d of the neural network 120, which involve convolving the output of the previous layer with 256 kernels and 512 kernels respectively in this example, in which the neural network 124 is the VGG-16 CNN. As will be appreciated, though, other neural networks may involve convolutions with a different number of kernels. Nevertheless, classification of an image using a neural network typically involves a larger number of data processing operations, each of which consumes power.

Figure 4:
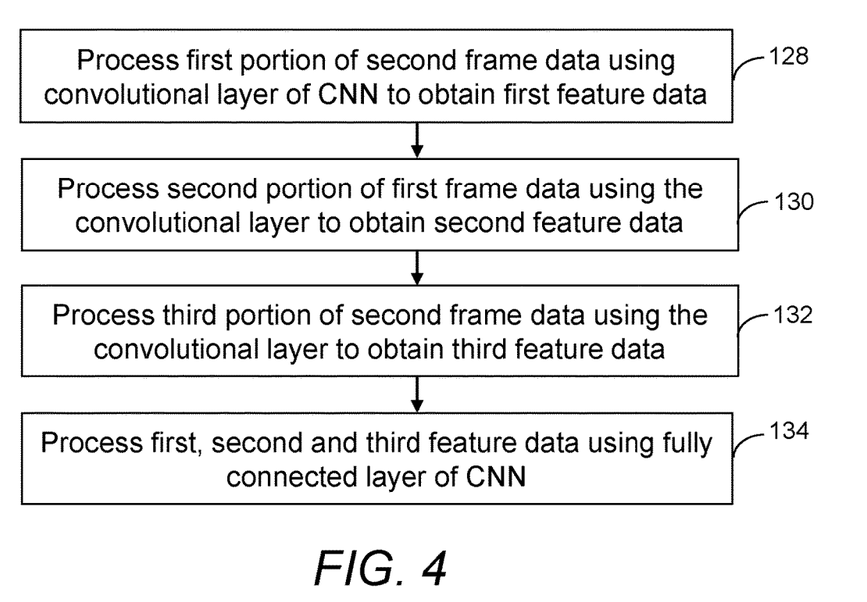
FIG. 4 is a flow diagram showing a method of generating output data according to examples.

Hence, the method in examples described herein, in which the feature detection operation (which may involve the processing of image data using at least a portion of a neural network) is omitted may reduce the power consumption of a video processing system. FIG. 4 is a flow diagram showing an example of a method in which a CNN is used for the feature detection operation.

At item 128 of FIG. 4, the first portion of the second frame data (which is associated with the first portion of the second frame, which is changed with respect to the first portion of the first frame) is processed using at least one convolutional layer of a CNN, such as the convolutional layers 126b, 126c of the neural network 124 of FIG. 3, to obtain first feature data. At item 130, the second portion of the first frame data is processed using the at least one convolutional layer of the CNN to obtain second feature data. At item 132, the third portion of the second frame data is processed using the at least one convolutional layer of the CNN to obtain the third feature data.

It is to be noted that the items of FIG. 4 are not necessarily arranged in time order. For example, the second portion of the first frame data may be processed, at item 130, before receipt of the second frame (and hence before the processing of items 128 and 134). The second feature data may for example be written to storage during processing of the second portion of the first frame data to perform the feature detection operation in the second portion of the first frame. The second feature data may subsequently be read from the storage after receipt of the second frame, during the identification of the at least one feature of the second frame, either before or after one or both of items 128 and 132.

At item 134 of FIG. 4, the first feature data, the second feature data and the third feature data are processed using at least one fully connected layer of the CNN to obtain the output data representative of the at least one feature of the second frame. In a CNN, a fully connected layer typically connects every neuron in one layer to every neuron in another layer, and may therefore be used to identify overall characteristics of an image, such as whether the second frame includes a particular object. Hence, the fully connected layer may be used to combine the first, second and third feature data to identify the at least one feature of the second frame. The first, second and third feature data are for example obtained by processing of the first, second and third portions of the second frame data using the same at least one convolutional layer of the CNN, with the fully connected layer configured to receive the output of the at least one convolutional layer of the CNN. In other words, the first, second and third feature data may represent features of different spatial portions of the second frame, as obtained by the same at least one convolutional layer of the CNN. The at least one convolutional layer for example includes a series of convolutional layers. For example, an output of a first one of the convolutional layers will be received as an input to a second one of the convolutional layers. An output of the second one of the convolutional layers is received as an input to a third one of the convolutional layers, and so on through the series of convolutional layers of the CNN. The series of convolutional layers may extract progressively more complex image features. For example, the first convolutional layer may extract relatively simple features, such as edges, whereas the second convolutional layer may extract more complex features such as eyes. The output of the final one of the convolutional layers is received as an input to the fully connected layer of CNN. There may however by a plurality of fully connected layers of the CNN, which (like the convolutional layers), may be arranged in sequence. For example, a second fully connected layer may be arranged to receive, as an input, an output of the first fully connected layer of the sequence of fully connected layers.

From the description of FIG. 4, it is therefore to be appreciated that, in some cases, the feature detection operation may involve the detection of high-level image features, relating to structures of an image such as lines, edges, corners, ridges and so forth. Such features may be expressed in the form of a feature map, which may be output as an intermediate stage of a neural network such as a CNN, although other formats are possible. In other cases, though, the feature detection operation may involve the detection of other image features corresponding to an output layer of a neural network or other machine learning system, or corresponding to other feature detection processes.

As explained above, in examples described herein a subset of substantially unchanged portions of a frame may be selected for performance of the feature detection operation. The substantially unchanged portions of the second frame which are selected for processing or for omission from processing may be selected based on update data. The update data for example represents when each of these portions were processed using the feature detection operation, prior to receipt of the second frame. For example, the update data may be processed to identify a substantially unchanged portion of the second frame which was processed using the feature detection operation less recently than another substantially unchanged portion. The substantially unchanged portion which was processed less recently may then be selected for processing the feature detection operation, whereas the other substantially unchanged portion may be selected for omission of processing.

Figure 5:
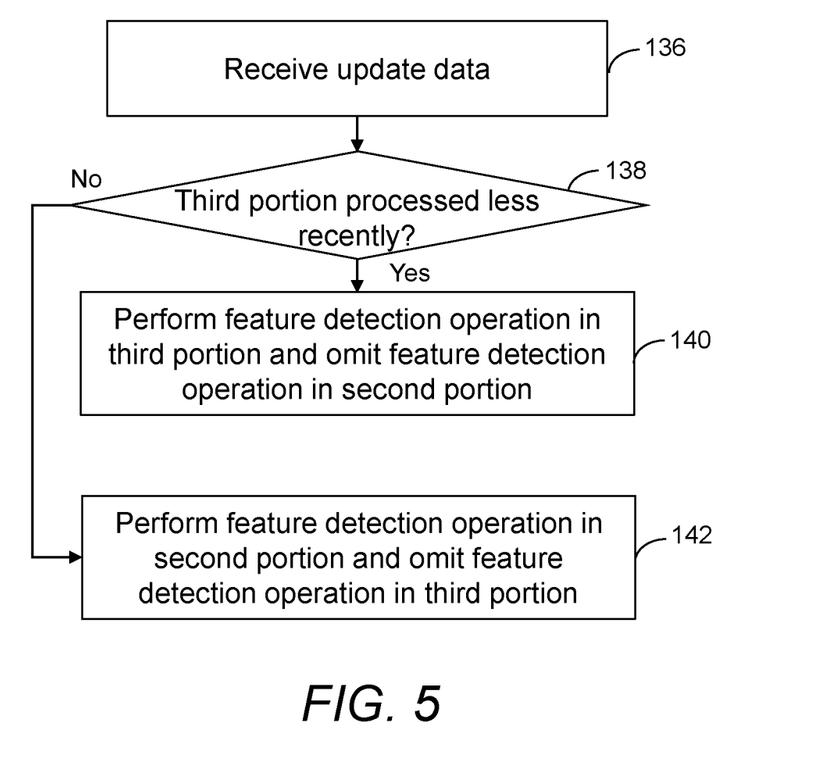
FIG. 5 is a flow diagram illustrating a method of determining which portion of a frame to perform a feature detection operation in and which portion of the frame to omit the feature detection operation in, according to examples.

FIG. 5 is a flow diagram illustrating an example of selecting the third portion of the second frame to perform the feature detection operation in. In the example of FIG. 5, the video includes a plurality of frames including the first and second frames, with each of the plurality of frames including a first, second and third portion, as described above.

At item 136 of FIG. 5, the update data is received. The update data is for example representative of when, prior to receipt of the second frame, the feature detection operation was performed in the first, second and third portions of the plurality of frames. The update data may for example include timestamp or frame data indicative of at what time or during which frame each of the first, second and third portions were previously processed using the feature detection operation. In examples such as FIG. 5, the third portion of the second frame in which the feature detection operation is performed in may be selected based on the update data. The update data therefore allows a subset of a plurality of substantially unchanged portions of a frame to be selected for performance of the feature detection operation, based on when each of these portions was last processed using the feature detection operation.

For example, at item 138 of FIG. 5 it is determined whether the third portion of the second frame data was processed less recently than the second portion of the second frame data (or least recently of all or a subset of portions of the second frame data associated with respective portions of the second frame which are substantially unchanged compared to the first frame). If the third portion of the second frame data has been processed less recently than the second portion of the second frame data, the feature detection operation is performed in the third portion of the second frame, and the feature detection operation is omitted in the second portion of the second frame, at item 140. If, however, the second portion of the second frame data has been processed less recently than the third portion of the second frame data, the feature detection operation is performed in the second portion of the second frame, and the feature detection operation is omitted in the third portion of the second frame, at item 142.

Examples described herein involve processing the second frame to identify the first portion of the second frame which changed with respect to the first portion of the first frame and the second and third portions of the second frame which are substantially unchanged with respect to the second and third portions of the first frame. FIG. 6 shows an example method which may be used to identify these portions of the second frame, although it is to be appreciated that numerous methods may be used to determine changes between two frames.

Figure 6:
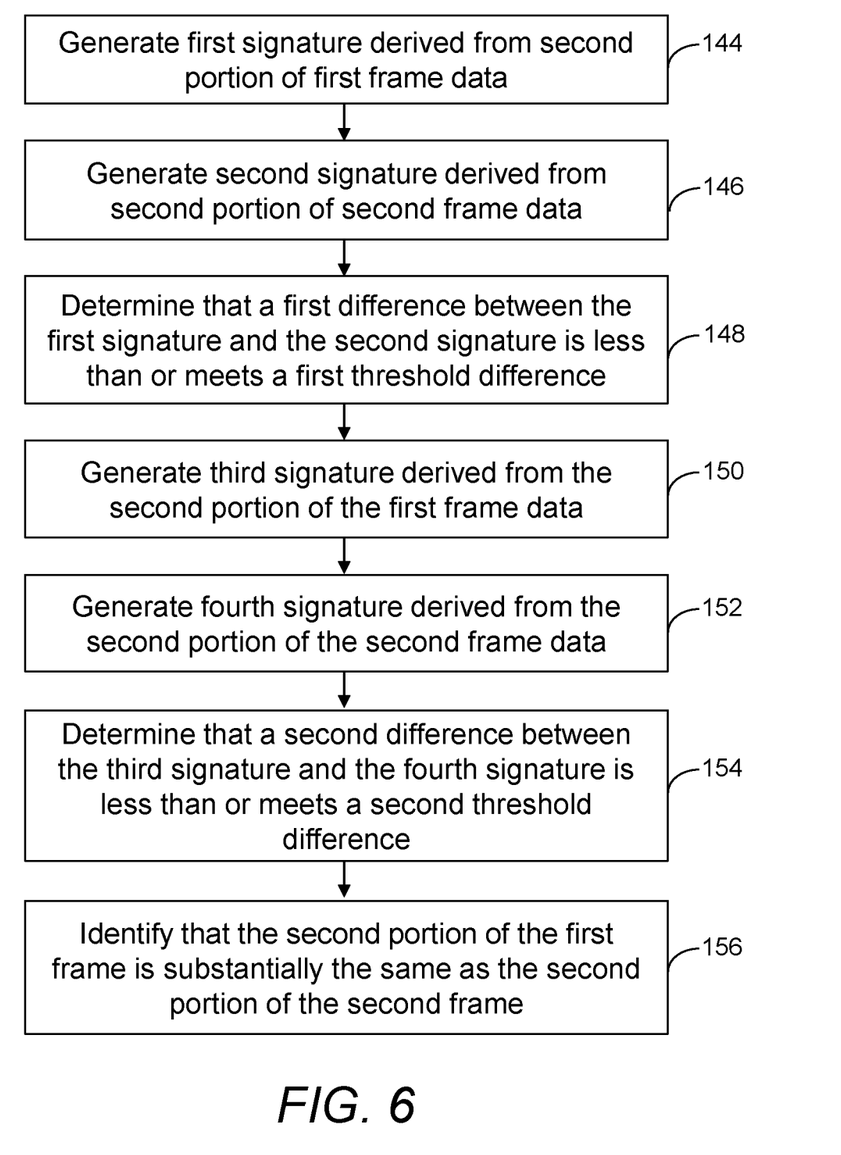
FIG. 6 is a flow diagram showing a method of determining differences between frames according to examples.

The method of FIG. 6 involves the comparison of first signature derived from the second portion of the first frame data with a second signature derived from the second portion of the second frame data to determine whether the second portion has changed between the first and second frames. As explained above, the second portion of the first and second frame data may represent image data, such as pixel values, of the second portions of the first and second frames, or feature data, such as feature maps, associated with the second portions of the first and second frames. A signature is for example any data which is representative of a content of a portion of a frame. For example, a signature may be obtained by applying a hashing algorithm to the portion of the frame. A hashing algorithm is for example a one-way algorithm in which an output (referred to as a hash) is deterministic such that the application of the hashing algorithm again to exactly the same input data will produce the same hash. The algorithm is one-way in that the original input data cannot be recovered from the hash alone, even with full knowledge of the hashing algorithm. A hash may be of a fixed length, which may be relatively small, and smaller than the portion of the frame represented by the hash. In this way, the first and second signatures may represent the second portions of the first and second frames in a manner which is efficient in terms of storage requirements and processing use.

In examples in accordance with FIG. 6, a separate signature may be derived for most and least significant bits of a portion of a frame (although in other examples, there may be solely one signature to represent a portion of a frame).

At item 144 of FIG. 6, a first signature is derived from at least one most significant bit of the second portion of the first frame data. At item 146, a second signature is derived from at least one most significant bit of the second portion of the second frame data.

A determination of whether the second portion has changed between the first and second frames may then be made based on the first and second signatures. The example method of FIG. 6 involves, at item 148, comparing the first signature with the second signature to determine that a first difference between the first and second signatures is less than or meets a first threshold difference. Based on this, it may be determined that the second portion of the second frame is substantially unchanged compared with the second portion of the first frame, although other comparisons or determinations may be made in other examples.

In some cases, it may be considered sufficient to determine whether the first and second signatures are sufficiently similar that the second portion may be considered substantially unchanged. For example, this may be the case where less precise feature detection is required, and a certain amount of change between frames may be tolerated without redoing the feature detection. In other cases, though, a further check may be performed to identify whether the second portion of the first and second frames is substantially unchanged. This is shown in FIG. 6. This further check may be performed where the first and second signatures derived from the at least one most significant bits of the second portions of the first and second frame data are less than or meet a first threshold difference. This may for example indicate that the second portions of the first and second frame data are at least similar to each other (as otherwise, the difference between the first and second signatures may exceed the first threshold difference). However, there may still be differences between the second portions of the first and second frames, which may be identified by the further check of FIG. 6, which is based on at least one least significant bit of the second portions of the first and second frame data.

At item 150 of FIG. 6, a third signature is derived from at least one least significant bit of the second portion of the first frame data. At item 152, a fourth signature is derived from at least one least significant bit of the second portion of the second frame data. At item 154, the third signature is compared with the fourth signature to determine that a second difference between the third and fourth signatures is less than or meets a second threshold difference (although other comparisons or determinations are possible in other examples). If so, the second portion of the second frame is identified as being substantially the same as the second portion of the first frame, at item 156 of FIG. 6. Conversely, if the second difference between the third and fourth signatures exceeds the second threshold difference (in cases in which the first difference between the first and second signatures is less than or meets the first threshold difference), this indicates that the second portion of the first and second frames are different from each other, but are nevertheless relatively similar. In such cases, the second portion of the second frame may be treated either as if it is substantially the same as the second portion of the first frame, or may be treated as if it is different from the second portion of the first frame. A decision as to how to categorize the second portion of the second frame in such cases may depend on the intended use of a video processing system configured to perform the method of examples, and on the available processing resources, which may vary over time.

In examples such as FIG. 6, the second threshold difference may be greater than the first threshold difference. In other ways, a larger degree of change between the least significant bit(s) of the second portion of the first and second frames may be tolerated than for the most significant bit(s).

As explained above, other methods of identifying substantially unchanged portions of a video may be used in other examples. For example, pixel values for the second portion of the second frame may be subtracted from pixel values for corresponding pixels of the second portion of the first frame to calculate a difference (sometimes referred to as a delta) between these two frames, to determine the extent of changes. In examples in which the first and second frame data is compressed, for example using any suitable video codec such as the H.264 (MPEG-4 AVC or Advanced Video Coding) or H.265 (MPEG-H Part 2 or High Efficiency Video Coding) video compression standards, the metadata associated with the codec can be compared for the two frames to determine the amount the second portion has changed between the first and second frames.

It is to be appreciated that similar methods as these may be used to identify that the first portion has changed from the first frame to the second frame, but based on a difference exceeding a given difference threshold, rather than meeting or being less than the difference threshold.

Although in examples signatures based on image data may be generated to determine an extent of change between corresponding regions in the first and second frames, in other examples signatures may be generated based on feature data (or other data) derived from the image data. FIG. 7 shows such an example.

Figure 7:
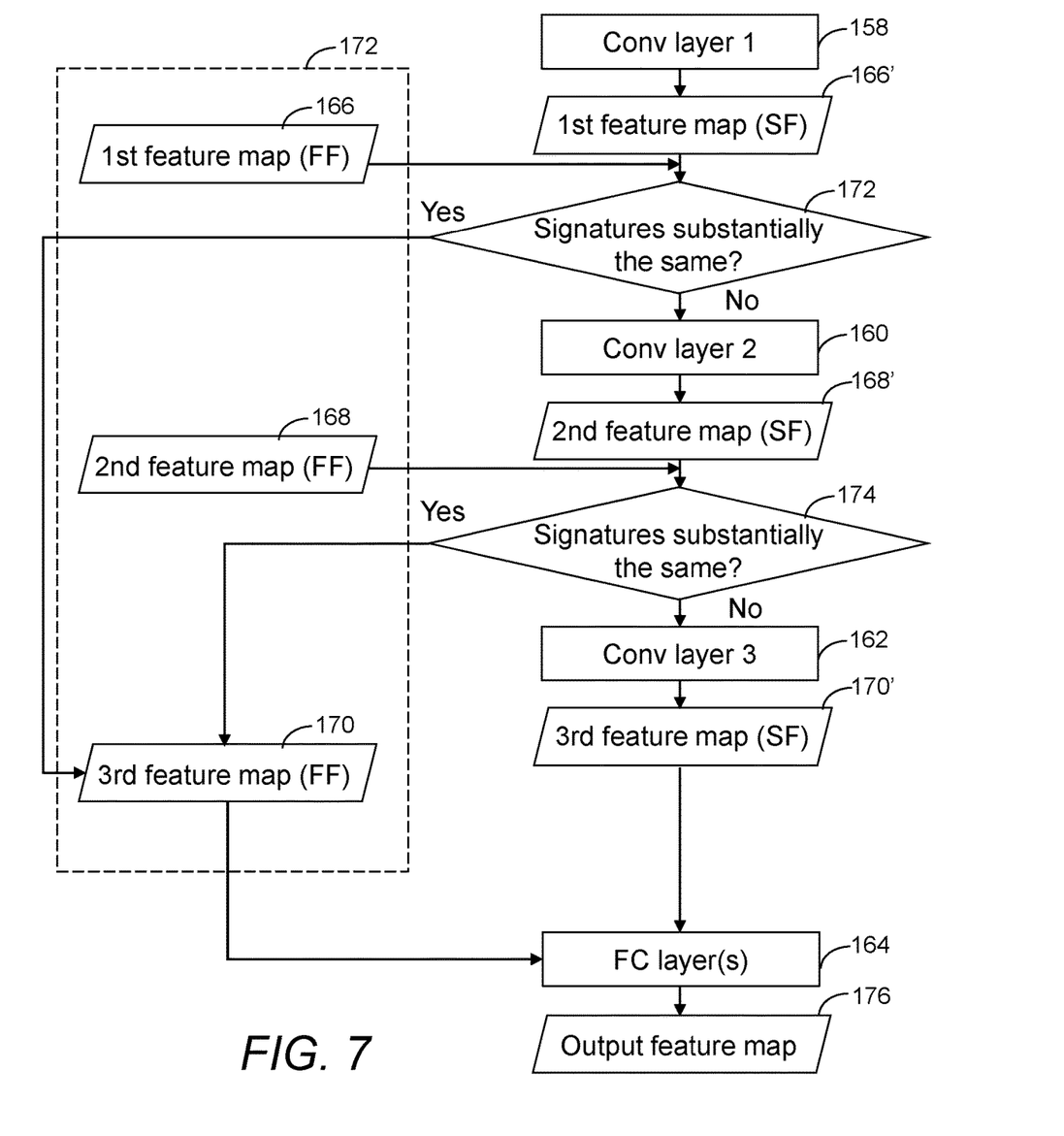
FIG. 7 is a flow diagram showing features of a method of processing video data according to examples.

In the method of FIG. 7, the second portions of the first and second frames are processed using a CNN, which may be similar to the neural network 124 of FIG. 3. In this example, the CNN includes a first, second and third convolutional layer 158, 160, 162 and at least one fully connected layer 164. The second portion of the first frame data (which is associated with the second portion of the first frame) is processed using the first, second and third convolutional layers 158, 160, 162 to generate a first, second and third feature map 166, 168, 170. The first, second and third feature maps 166, 168, 170 associated with the second portion of the first frame are stored in storage 172. In this example, the processing applied by each of the first, second and third convolutional layers 158, 160, 162 may be considered to correspond to a different respective feature detection operation, as each of these layers is typically configured to detect a different respective feature of an input image.

After processing of the first frame, the second portion of the second frame data (which is associated with the second portion of the second frame) may be processed using the first, second and third convolutional layers 158, 160, 162 of the CNN to generate a first, second and third feature map 166', 168', 170' associated with the second portion of the second frame. This may be performed sequentially, however, depending on whether signatures derived from the first, second and third feature maps of the second portions of the first and second are sufficiently different.

For example, the first feature map 166 (which may be referred to as first feature data in this example) associated with the first frame may be processed to generate first signature data representative of a first signature. For example, the first feature map 166 may be hashed using a hashing algorithm. The first feature map 166' associated with the second frame (which may be referred to as second feature data in this example) may then be processed to generate second signature data representative of a second signature, for example also using the hashing algorithm.

At item 172 of FIG. 7, the first and second signatures may be compared to determine whether the first feature maps 166, 166' associated with the first and second frames are substantially the same. For example, these feature maps may be considered to be substantially the same on the basis that a difference between the first signature and the second signature is less than or meets a threshold difference. As explained above with reference to FIG. 6, these signatures may be derived solely from at least one most significant bit of the first feature maps 166, 166', or from all the bits of the first feature maps, and a further comparison between signatures derived from at least one least significant bit of the first feature maps 166, 166' may also be performed.

This comparison may be used to identify cases in which, despite differences in the second portions of the first and second frames, the feature maps obtained for these portions using the first convolutional layer 158 are nevertheless substantially the same.

If, at item 172 of FIG. 7, it is determined that the first and second signatures are substantially the same, in which case it may be considered that the second portion of the second frame is substantially the same as the second portion of the first frame, the method may include ceasing to process the second feature data using at least one further convolutional layer of the CNN. For example, instead of transferring the second feature data (which in this case corresponds to the first feature map 166') to the second and third convolutional layers 160, 162, processing by the convolutional layers of the CNN may cease. Instead, an output of the convolutional layers obtained for the second portion of the first frame (in this case, the third feature map 170) may be retrieved from the storage 172 and combined with other feature maps, for example for other portions of the second frame, by the fully connected layer(s) 164.

If, however, it is determined that the first and second signatures are different, the processing of the second portion of the second frame may continue to the second convolutional layer 160. A similar comparison of a signature derived from the second feature map 168' associated with the second frame and the second feature map 168 associated with the first frame may be performed at item 174 of FIG. 7. As will be appreciated, there may be even more similar comparisons in cases in which there are more convolutional layers than those shown in the example of FIG. 7. As for item 172, if the signatures derived from the second feature maps 168, 168' are substantially the same, the third convolutional layer 162 may be bypassed, and the third feature map 170 associated with the first frame may be output to represent the second portion of the first frame. If, however, the signatures are different, the second feature map 168' may be processed by the third convolutional layer 162 to generate the third feature map 170'. It is to be appreciated that FIG. 7 is simplified for ease of understanding, and that there may be other processes not illustrated (such as pooling or the application of an activation function to a feature map).

Finally, at item 176, output data representative of the at least one feature of the second frame is output from the fully connected layer(s) 164.

The method of FIG. 7 may be repeated for other portions of the first and second frames, such as other blocks or tiles of the first and second frames. In this way, signatures may be generated for each of a plurality of blocks of the first and second frames, and for each of a plurality of convolutional layers of the CNN used to process the blocks of the first and second frames.

Figure 8:
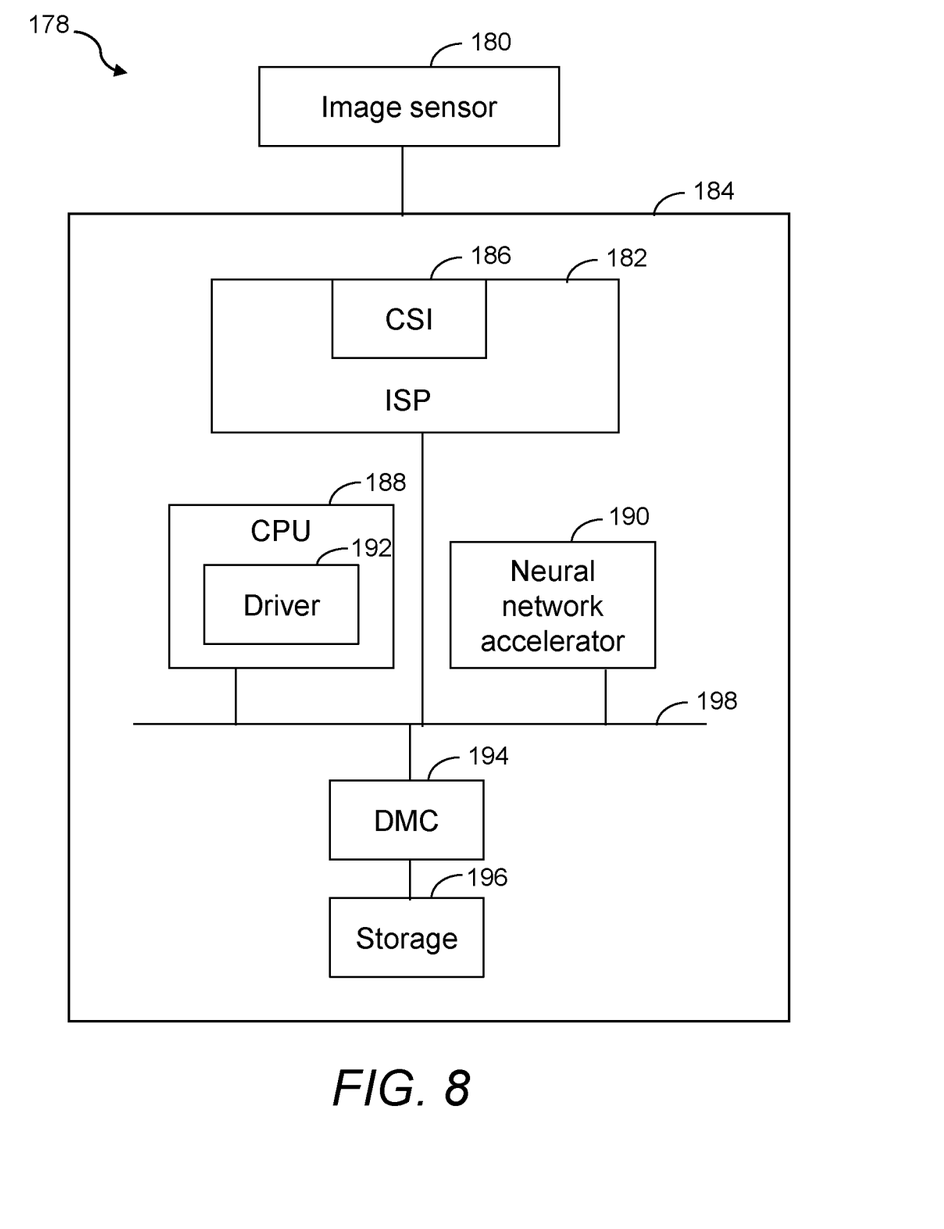
FIG. 8 shows schematically internal components of a video processing system according to examples.

An example of a video processing system 178 for use with the methods described herein is shown schematically in FIG. 8. The video processing system 178 of FIG. 8 may be coupled to or form part of a computer device, such as a personal computer, a laptop, a smartphone or an on-board computer device which may be coupled to or mounted within a vehicle such as a car.

The video processing system 178 includes an image sensor 180. An image sensor typically includes an array of sensor pixels, which may be any suitable photosensors for capturing images. For example, a typical sensor pixel includes a photosensitive element such as a photodiode that can convert incident light into electronic signals or data. The sensor pixel may for example be a charge-coupled device (CCD) or a complementary metal-oxide-semiconductor (CMOS). The image sensor 180 in this example is arranged to capture video data, which may be in the form of a series of images captured sequentially, with each image corresponding to a frame of the video.

In FIG. 8, the image sensor 180 is arranged to transfer video data to an image signal processor (ISP) 182 of a computing system 184 via a camera serial interface (CSI) 186. The ISP 182 may perform initial processing of video data (such as individual frames of the video) to prepare the video for display. For example, the ISP 182 may perform saturation correction, renormalization, white balance adjustment and/or demosaicing, although this is not to be taken as limiting.

The computing system 184 of FIG. 8 includes at least one processor. The at least one processor is for example configured to perform the methods described herein. In this example, the computing system 184 includes a central processor unit (CPU) 188. The computing system 184 also includes a neural network accelerator 190, which is a processor dedicated to implementing at least classification of data using a neural network. For example, the neural network accelerator 190 may be configured to implement a neural network such as those described above. In other examples, though, a neural network may be implemented using a more general processor, such as the CPU or a GPU.

In other examples, though, the computing system may include other or alternative processors such as a microprocessor, a general purpose processor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. The computing system may also or alternatively include a processor implemented as a combination of computing devices, e.g., a combination of a DSP and a microprocessor, a plurality of microprocessors, one or more microprocessors in conjunction with a DSP core, or any other such configuration. The computing system may also or alternatively include at least one graphics processing unit (GPU).

The CPU 188 of FIG. 8 includes a driver 192 which for example provides an interface between software configured to control or configure the neural network and the neural network accelerator 190, which is configured to perform the processing to implement the neural network (in this example in which a neural network is used for the feature detection operation). The driver 192 may therefore form part of or correspond to a control system for controlling the operation of the at least one processor.

The computing system 184 of FIG. 8 also includes a dynamic memory controller (DMC) 194 which may be used to control access to storage 196 of the computing system 184. The storage 196 is for example configured to store the video data received from the ISP 182.

The storage 196 is for example external to the neural network accelerator 190 and may be a random access memory (RAM) such as DDR-SDRAM (double data rate synchronous dynamic random access memory). In other examples, the storage 196 may be or include a non-volatile memory such as Read Only Memory (ROM) or a solid state drive (SSD) such as Flash memory. The storage 196 in examples may include further storage devices, for example magnetic, optical or tape media, compact disc (CD), digital versatile disc (DVD) or other data storage media. The storage 196 may be removable or non-removable from the computing system 184.

The components of the computing system 184 in the example of FIG. 8 are interconnected using a systems bus 198. This allows data to be transferred between the various components. The bus 198 may be or include any suitable interface or bus. For example, an ARM® Advanced Microcontroller Bus Architecture (AMBA®) interface, such as the Advanced eXtensible Interface (AXI), may be used.

The at least one processor may be configured to write, to the storage 196, first feature data generated by processing the second portion of the first frame data to perform the feature detection operation in the second portion of the first frame. In this way, the first feature data may be retrieved from the storage 196 subsequently, for example during identification of the at least one feature of the second frame. For example, the neural network accelerator 190 may retrieve the first feature data from the storage 196, which is for example system storage or a main memory. In other examples, feature data such as the first feature data maybe written to local storage accessible to a processor configured to perform the feature detection operation, such as local storage of the neural network accelerator 190. In examples in which the neural network accelerator 190 is implemented in hardware, the local storage may be on-chip memory. The local stage may for example be a static random access memory (SRAM), although other memory types are possible.

It is to be appreciated that the video processing system 178 of FIG. 8 is merely an example and other video processing systems may be used in other examples. For example, where the feature detection operation does not include a neural network, the video processing system may not include a neural network accelerator.

The above examples are to be understood as illustrative examples. Further examples are envisaged.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. A method of processing video data representative of a video comprising a first frame and a second frame subsequent to the first frame, the method comprising:
    identifying at least one feature of the first frame by:
        processing a first portion of first frame data associated with the first frame, the first portion of the first frame data being associated with a first portion of the first frame, to perform a feature detection operation in the first portion of the first frame; and
        processing a second portion of the first frame data, the second portion of the first frame data associated with a second portion of the first frame, to perform the feature detection operation in the second portion of the first frame;
    subsequently identifying at least one feature of the second frame by:
        processing the second frame to identify a first portion of the second frame which changed with respect to the first portion of the first frame, a second portion of the second frame which is substantially unchanged with respect to the second portion of the first frame, and a third portion of the second frame which is substantially unchanged with respect to a third portion of the first frame, the third portion of the first frame being different from the first and second portions of the first frame, and the third portion of the second frame being different from the first and second portions of the second frame;
        processing a first portion of second frame data associated with the second frame, the first portion of the second frame data being associated with the first portion of the second frame, to perform the feature detection operation in the first portion of the second frame;
        processing a third portion of the second frame data associated with the third portion of the second frame to perform the feature detection operation in the third portion of the second frame; and
        omitting processing of a second portion of the second frame data associated with the second portion of the second frame to omit the feature detection operation in the second portion of the second frame.

2. The method according to claim 1, wherein identifying the at least one feature of the second frame comprises combining first feature data obtained from performing the feature detection operation in the first portion of the second frame, second feature data obtained from performing the feature detection operation in the second portion of the first frame, and third feature data obtained from performing the feature detection operation in the third portion of the second frame.

3. The method according to claim 2, comprising retrieving the second feature data from storage.

4. The method according to claim 2, wherein identifying the at least one feature of the second frame comprises:
    processing the first portion of the second frame data using at least one convolutional layer of a convolutional neural network (CNN) to obtain the first feature data;
    processing the second portion of the first frame data using the at least one convolutional layer of the CNN to obtain the second feature data;
    processing the third portion of the second frame data using the at least one convolutional layer of the CNN to obtain the third feature data; and
    processing the first feature data, the second feature data and the third feature data using at least one fully connected layer of the CNN to obtain output data representative of the at least one feature of the second frame.

5. The method according to claim 1, wherein the feature detection operation comprises detecting at least one image feature using a convolutional neural network (CNN).

6. The method according to claim 1, wherein the video comprises a plurality of frames comprising the first frame and the second frame, each of the plurality of frames comprising a first portion, a second portion and a third portion, and
    identifying the at least one feature of the second frame comprises selecting the third portion of the second frame to perform the feature detection operation in based on update data representative of when, prior to receipt of the second frame, the feature detection operation was performed in the first portion, the second portion and the third portion of the plurality of frames.

7. The method according to claim 6, wherein selecting the third portion of the second frame to perform the feature detection operation in comprises processing the update data to identify that the feature detection operation was performed less recently in the third portion of the plurality of frames than in the second portion of the plurality of frames.

8. The method according to claim 6, wherein identifying the at least one feature of the second frame comprises selecting the second portion of the second frame to omit the feature detection operation in by processing the update data to identify that the feature detection operation was performed more recently in the second portion of the plurality of frames than in the third portion of the plurality of frames.

9. The method according to claim 1, wherein the video comprises a plurality of frames comprising the first frame and the second frame, each of the plurality of frames comprising a first portion, a second portion and a third portion respectively, and the method comprises:
    determining that a first rate of change of the first portion of the plurality of frames is higher than a second rate of change of the second portion of the plurality of frames; and
    performing the feature detection operation in the first portion of the plurality of frames at a first rate which is higher than a second rate of performing the feature detection operation in the second portion of the plurality of frames.

10. The method according to claim 9, wherein the method comprises:
    determining that the first rate of change is higher than a third rate of change of the third portion of the plurality of frames; and
    performing the feature detection operation in the third portion of the plurality of frames at a third rate which is lower than the first rate,
    wherein each of the second rate and the third rate meets or exceeds a threshold processing rate.

11. The method according to claim 1, wherein processing the second frame to the second portion of the second frame which is substantially unchanged with respect to the second portion of the first frame comprises comparing a first signature derived from the second portion of the first frame data with a second signature derived from the second portion of the second frame data.

12. The method according to claim 11, wherein the first signature is derived from at least one most significant bit of the second portion of the first frame data and the second signature is derived from at least one most significant bit of the second portion of the second frame data and processing the second frame data to identify the second portion of the second frame which is substantially unchanged with respect to the second portion of the first frame comprises:
    comparing a third signature derived from at least one least significant bit of the second portion of the first frame data with a fourth signature derived from at least one least significant bit of the second portion of the second frame data.

13. The method according to claim 12, wherein:
    comparing the first signature with the second signature comprises determining that a first difference between the first signature and the second signature is less than or meets a first threshold difference;
    comparing the third signature with the fourth signature comprises determining that a second difference between the third signature and the fourth signature is less than or meets a second threshold difference; and
    the second threshold difference is greater than the first threshold difference.

14. The method according to claim 1, wherein identifying the second portion of the second frame which is substantially the same as the second portion of the first frame comprises:
    processing the second portion of the first frame data using a convolutional layer of a convolutional neural network (CNN) to generate first feature data;
    processing the first feature data to generate first signature data representative of a first signature;
    processing the second portion of the second frame data using the convolutional layer of the CNN to generate second feature data;
    processing the second feature data to generate second signature data representative of a second signature; and
    identifying that the second portion of the second frame is substantially unchanged with respect to the second portion of the first frame on the basis that a difference between the first signature and the second signature is less than or meets a threshold difference.

15. The method according to claim 14, wherein processing the first feature data comprises applying a hashing algorithm to the first feature data and processing the second feature data comprises applying the hashing algorithm to the second feature data.

16. The method according to claim 14, wherein the CNN comprises at least one further convolutional layer and the method comprises ceasing to process the second feature data using the at least one further convolutional layer in response to determining that the second portion of the second frame is substantially the same as the second portion of the first frame.

17. The method according to claim 1, wherein identifying the second portion of the second frame comprises determining the second portion of the second frame which corresponds to the second portion of the first frame based on motion data indicative of a motion of an image sensor used to capture the video data.

18. A video processing system comprising:
    at least one processor; and
    storage accessible by the at least one processor, the storage configured to store video data representative of a video comprising a first frame and a second frame subsequent to the first frame,
    wherein the at least one processor is configured to:
        identify at least one feature of the first frame by:
            processing a first portion of first frame data associated with the first frame, the first portion of the first frame data being associated with a first portion of the first frame, to perform a feature detection operation in the first portion of the first frame; and
            processing a second portion of the first frame data, the second portion of the first frame data associated with a second portion of the first frame, to perform the feature detection operation in the second portion of the first frame;
        subsequently identify at least one feature of the second frame by:
            processing the second frame to identify a first portion of the second frame which changed with respect to the first portion of the first frame, a second portion of the second frame which is substantially unchanged with respect to the second portion of the first frame, and a third portion of the second frame which is substantially unchanged with respect to a third portion of the first frame, the third portion of the first frame being different from the first and second portions of the first frame, and the third portion of the second frame being different from the first and second portions of the second frame;

processing a first portion of second frame data associated with the second frame, the first portion of the second frame data being associated with the first portion of the second frame to perform the feature detection operation in the first portion of the second frame;

processing a third portion of the second frame data associated with the third portion of the second frame to perform the feature detection operation in the third portion of the second frame; and omitting processing of a second portion of the second frame data associated with the second portion of the second frame to omit the feature detection operation in the second portion of the second frame.

19. The video processing system according to claim 18, wherein the at least one processor is configured to:

write, to the storage, first feature data generated by performing the feature detection operation in the second portion of the first frame; and retrieve, from the storage, the first feature data during identification of the at least one feature of the second frame.

20. The video processing system according to claim 19, wherein the at least one processor is configured to process the second portion of the first frame data using at least one convolutional layer of a convolutional neural network (CNN) to obtain the first feature data, wherein the storage comprises weight data associated with the at least one convolutional layer of the CNN.

* * * * *